US009186622B1

(12) United States Patent
Ranjan et al.

(10) Patent No.: US 9,186,622 B1
(45) Date of Patent: Nov. 17, 2015

(54) DEVICE FOR SEPARATION OF OXYGEN AND NITROGEN

(71) Applicant: Hamilton Sundstrand Corporation, Windsor Locks, CT (US)

(72) Inventors: Rajiv Ranjan, Vernon, CT (US); Zissis A. Dardas, Worcester, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/301,945

(22) Filed: Jun. 11, 2014

(51) Int. Cl.
| *B01D 53/22* | (2006.01) |
| *C01B 13/02* | (2006.01) |
| *C01B 21/04* | (2006.01) |
| *B01D 63/02* | (2006.01) |
| *B01D 67/00* | (2006.01) |
| *B01D 71/02* | (2006.01) |
| *B01D 71/06* | (2006.01) |
| *B01D 69/10* | (2006.01) |
| *B82Y 40/00* | (2011.01) |

(52) U.S. Cl.
CPC ............ *B01D 53/229* (2013.01); *B01D 53/228* (2013.01); *B01D 63/021* (2013.01); *B01D 67/0069* (2013.01); *B01D 69/10* (2013.01); *B01D 71/028* (2013.01); *B01D 71/06* (2013.01); *C01B 13/0255* (2013.01); *C01B 21/0444* (2013.01); *B01D 2053/224* (2013.01); *B01D 2313/40* (2013.01); *B01D 2325/12* (2013.01); *B82Y 40/00* (2013.01)

(58) Field of Classification Search
CPC .. B01D 53/228; B01D 53/229; B01D 63/021; B01D 67/0069; B01D 71/028; B01D 71/06; B01D 69/10; B01D 2053/224; B01D 2325/12; B01D 2313/40; C01B 13/0255; C01B 21/0444; B82Y 40/00
See application file for complete search history.

(56) References Cited

U.S. PATENT DOCUMENTS

| 4,554,076 | A | * | 11/1985 | Speaker ........................ 210/639 |
| 5,763,347 | A | * | 6/1998 | Lai ..................................... 502/4 |
| 5,895,769 | A | * | 4/1999 | Lai ..................................... 502/4 |
| 8,226,862 | B2 | * | 7/2012 | Liu et al. ....................... 264/45.9 |
| 8,337,588 | B2 | * | 12/2012 | Shqau et al. ..................... 95/51 |
| 8,394,453 | B2 | * | 3/2013 | Liu et al. ........................ 427/244 |
| 2004/0173094 | A1 | * | 9/2004 | Nakayama et al. ............... 95/45 |
| 2004/0265210 | A1 | * | 12/2004 | Shinohara et al. .......... 423/447.3 |
| 2005/0229779 | A1 | * | 10/2005 | Nakayama et al. ............... 95/45 |
| 2007/0022877 | A1 | * | 2/2007 | Marand et al. ..................... 95/51 |
| 2007/0045174 | A1 | * | 3/2007 | Yeung et al. .............. 210/500.21 |
| 2008/0039554 | A1 | * | 2/2008 | Liu et al. ........................ 523/310 |
| 2008/0217240 | A1 | * | 9/2008 | Yabuki et al. ............ 210/500.25 |
| 2009/0126567 | A1 | * | 5/2009 | Liu et al. ........................... 95/45 |
| 2011/0017611 | A1 | * | 1/2011 | Menozzi et al. ............... 205/763 |
| 2011/0027163 | A1 | * | 2/2011 | Shinohara et al. .......... 423/447.2 |
| 2011/0040013 | A1 | * | 2/2011 | Tsapatsis et al. .............. 524/430 |
| 2011/0076448 | A1 | * | 3/2011 | Agarwal et al. ............... 428/138 |
| 2012/0031833 | A1 | * | 2/2012 | Ho et al. ........................ 210/488 |
| 2012/0165558 | A1 | * | 6/2012 | Ryoo et al. .................... 549/403 |
| 2013/0059722 | A1 | * | 3/2013 | Tsapatsis et al. ................. 502/4 |
| 2013/0158182 | A1 | * | 6/2013 | Menozzi et al. ............... 524/439 |
| 2014/0161717 | A1 | * | 6/2014 | Johnson et al. ................ 423/704 |
| 2014/0295178 | A1 | * | 10/2014 | Watanabe et al. ............. 428/338 |
| 2014/0332728 | A1 | * | 11/2014 | Goino et al. ................... 252/478 |
| 2014/0356280 | A1 | * | 12/2014 | Ouyang et al. ................ 423/713 |
| 2014/0356973 | A1 | * | 12/2014 | Okrut et al. .................... 436/134 |
| 2014/0360938 | A1 | * | 12/2014 | Hayashi et al. ............... 210/638 |
| 2015/0045206 | A1 | * | 2/2015 | Tsapatsis et al. ............... 502/62 |

OTHER PUBLICATIONS

Down "Smoothing out zeolite nanosheet synthesis," Royal Society of Chemistry, 2 pages, Oct. 6, 2011, http://www.rsc.org/chemistryworld/News/2011/Oct./06101105.asp.*
Li et al. "Growth of zeolite crystals with graphene oxide nanosheets" The Royal Society of Chemistry, 2012, 8 pages, http://www.rsc.org/suppdata/cc/c2/c2cc17378f/c2cc17378f.pdf.*

* cited by examiner

*Primary Examiner* — Jason M Greene
*Assistant Examiner* — Anthony Shumate
(74) *Attorney, Agent, or Firm* — Cantor Colburn LLP

(57) ABSTRACT

A method of separating oxygen from nitrogen involves delivering air to a first side of a membrane comprising a polymer support and a layer of zeolite nanosheet particles with thickness of 2 nm to 10 nm and mean diameter of 5 nm to 5000 nm. The delivered air provides a pressure differential between opposite sides of the membrane, thus causing oxygen in the hollow core to diffuse through the polymer support and the zeolite nanosheet layer to the second side of the membrane. The preferential diffusion of oxygen (compared to diffusion of nitrogen) through the membrane produces nitrogen-enriched air on the first side of the membrane and oxygen-enriched air on the second side of the membrane.

15 Claims, 2 Drawing Sheets

DEVICE FOR SEPARATION OF OXYGEN AND NITROGEN

BACKGROUND OF THE INVENTION

Various devices have been utilized over time for the separation of nitrogen and oxygen from air. Many such devices rely on a membrane that is exposed to pressurized air, such that oxygen molecules preferentially (compared to the larger nitrogen molecules) diffuse through the membrane, resulting in an oxygen-enriched gas on one side of the membrane and a nitrogen-rich gas on the other side of the membrane. These gases are also referred to as oxygen-enriched air (OEA) and nitrogen-enriched air (NEA), respectively. The effectiveness of membranes at performing the task of separating gases can be characterized by a trade-off that membranes experience between permeability of the membrane to the gas molecules targeted for diffusion across the membrane versus selectivity of the membrane between the targeted gas molecules and other molecules in the gas mixture. A plot of the collection of permeability versus selectivity values for various materials is known as a Robeson plot, and the upper performance limit of membrane materials is identified by a line along that plot known as the Robeson limit. Various types of materials have been used as membranes for gas separation. Inorganic metal oxides of various compositions and crystal structures have been proposed, but the materials are brittle and susceptible to damage and are also difficult to fabricate in membrane configurations. Various types of polymer and/or polymer composite materials have also been proposed. These materials can overcome some of the mechanical limitations of inorganic materials, but they typically rely on a membrane structure where selectivity is provided by a combination of the gas molecule solubility in the polymer matrix and its diffusivity through the polymer matrix, i.e. the torturous path that the gas molecules must traverse through in order to cross the membrane, and may not provide a Robeson limit that is as high as desired. Attempts to increase the selectivity of composites by incorporating high-selectivity materials into a polymer matrix have met with limited success because polymer matrices configured to prevent gas molecules from bypassing the dispersed selective material component also tend to limit the overall permeability of the membrane. Moreover, in most of the cases, these highly selective materials are incompatible with the polymer matrix, which leads to voids in the composite and reduction in selectivity.

There are, of course, many uses for OEA or NEA, so there are a variety of applications for devices that separate oxygen and nitrogen, including but not limited to medical oxygen concentrators, atmospheric oxygen supplementation systems, and NEA-based combustion suppression systems. In recent years, commercial and other aircraft have been equipped with fuel tank suppression systems that introduce NEA into a fuel tank headspace or ullage, often by bubbling NEA through the liquid fuel. Such systems require NEA with a nitrogen concentration of at least 90% by volume, and attempt to minimize payload weight and size while maintaining target NEA output across a wide variety of operating conditions. Nitrogen-generating using membrane technology has been used and proposed for use in these and other systems; however many of these systems suffer from various shortcomings such as performance specification limitations imposed by the membrane's Robeson limit, lack of stability in performance specifications over time, inability to maintain performance levels across a wide variety of conditions, inability to meet payload weight or size requirements, etc.

Accordingly, there continues to be a need for new approaches to the separation of nitrogen and oxygen.

BRIEF DESCRIPTION OF THE INVENTION

According to some aspects of the invention, a method of separating oxygen from nitrogen, comprises delivering air to a first side of a membrane comprising a polymer support and a layer comprising a plurality of zeolite nanosheet particles (zeolite nanosheet particles may also be referred to herein as zeolite nanosheets) with thickness of 2 nm to 10 nm and mean diameter of 50 nm to 5000 nm. It should be noted that, as used herein, "air" includes natural air from the Earth's atmosphere and also includes any gas mixture comprising nitrogen and oxygen for which the methods and materials described herein are used to separate oxygen in the gas mixture from nitrogen in the gas mixture). The delivered air provides a pressure differential between opposite sides of the membrane, thus causing oxygen in the hollow core to diffuse through the polymer support and the layer comprising zeolite nanosheet particles to the second side of the membrane. This preferential diffusion of oxygen (compared to the diffusion of nitrogen) through the membrane produces nitrogen-enriched air on the first side of the membrane and oxygen-enriched air on the second side of the membrane.

According to some aspects of the invention, a device for separating nitrogen and oxygen comprises a hollow polymer fiber comprising a polymer shell surrounding a hollow core. The hollow core extends from one end of the fiber to the other end of the fiber and is open at one end of the fiber to receive a flow of air and open at the opposite end of the fiber to discharge a flow of nitrogen-enriched air. The fiber has a layer disposed on its exterior surface, comprised of a plurality of zeolite nanosheet particles with thickness of 2 nm to 10 nm and mean diameter of 50 nm to 5000 nm.

According to some aspects of the invention, the above hollow fiber device can be prepared by disposing a hollow polymer fiber comprising a polymer shell surrounding a hollow core that extends from one end of the fiber to the other end of the fiber, in a coating composition comprising zeolite nanosheet particles with thickness of 2 nm to 10 nm and mean diameter of 50 nm to 5000 nm, such that the hollow core is isolated from the coating composition at each fiber end is connected to a source of vacuum on at least one end of the fiber. A vacuum is drawn the hollow core of the fiber to cause a pressure differential between the exterior and the hollow core of the hollow polymer fiber, which in turn causes deposition of a layer comprising zeolite nanosheet particles onto the hollow polymer fiber exterior. The zeolite nanosheet particle layer can then be heated to fuse the nanosheets together.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying figures, in which:

DETAILED DESCRIPTION OF THE INVENTION

Figure 1:
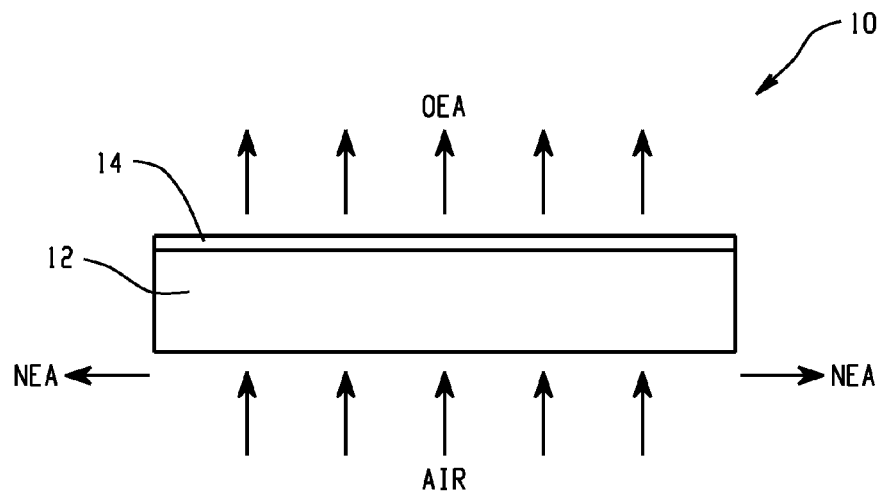
FIG. 1 is a schematic depiction of an exemplary planar membrane for separating nitrogen and oxygen.
Figure 2:
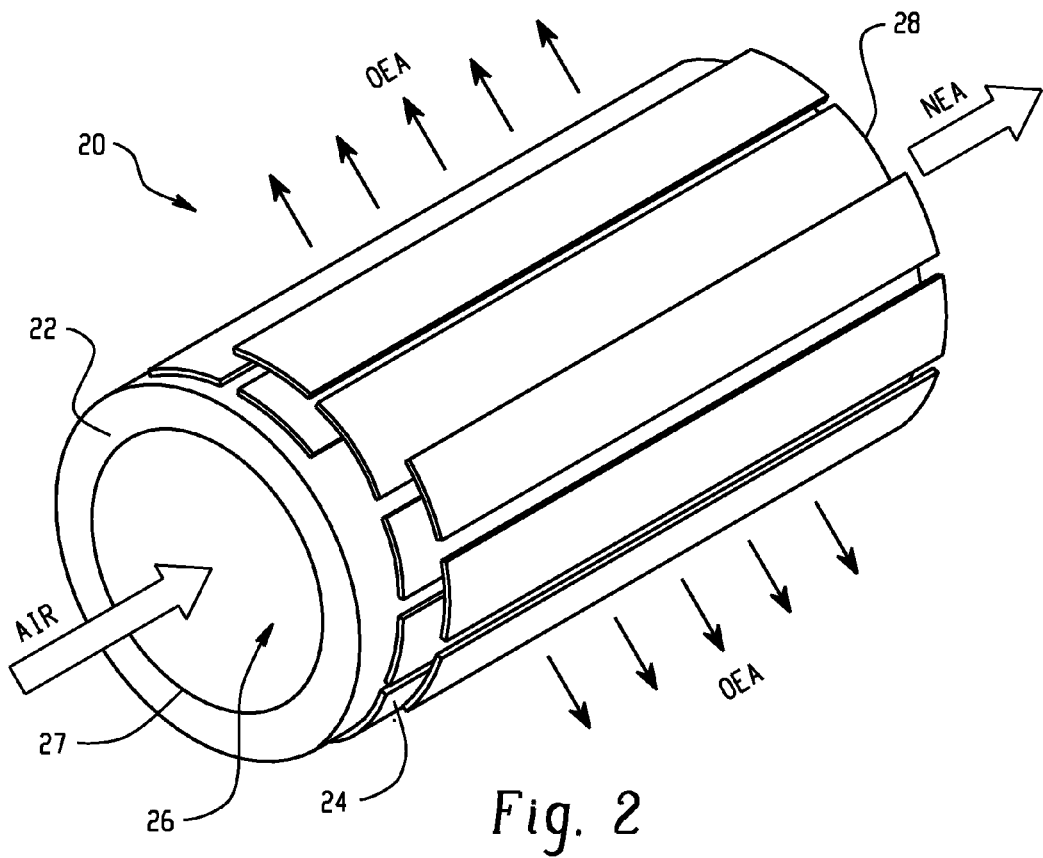
FIG. 2 is a schematic depiction of an exemplary tubular membrane for separating nitrogen and oxygen.

With reference to the Figures, FIGS. 1 and 2 schematically depict exemplary membranes for separating nitrogen and oxygen. FIG. 1 depicts a flat or planar membrane 10 comprising a polymer support 12 and zeolite nanosheet layer 14. In use, air is delivered to the surface of polymer support 12 to provide a pressure differential across the membrane. In response, oxygen molecules preferentially diffuse through the membrane 10 compared to nitrogen molecules, resulting in a flow of OEA from the upper surface of the membrane 10 (e.g., through layer 14) as shown in FIG. 1, and a flow of NEA from the lower surface of membrane 10 as shown in FIG. 1.

FIG. 2 depicts a tubular membrane 20 comprising a polymer tubular shell 22 surrounded by a zeolite nanosheet layer 24. The shell defines a hollow core 26 that is open at both ends. In use, pressurized air is delivered into the hollow core 26 at an inlet end 27 of the membrane 20. The pressure of the air is greater than air outside the core 26 such that a pressure differential between the hollow core 26 and the air exterior of the membrane 20 exists. Oxygen molecules preferentially diffuse through the tubular membrane 20 compared to nitrogen molecules, resulting in a flow of OEA from the outer surface of the tubular membrane 20 as shown in FIG. 2, and a flow of NEA from the hollow core 26 at the outlet end 28 of the membrane 20 as shown in FIG. 2.

Figure 3:
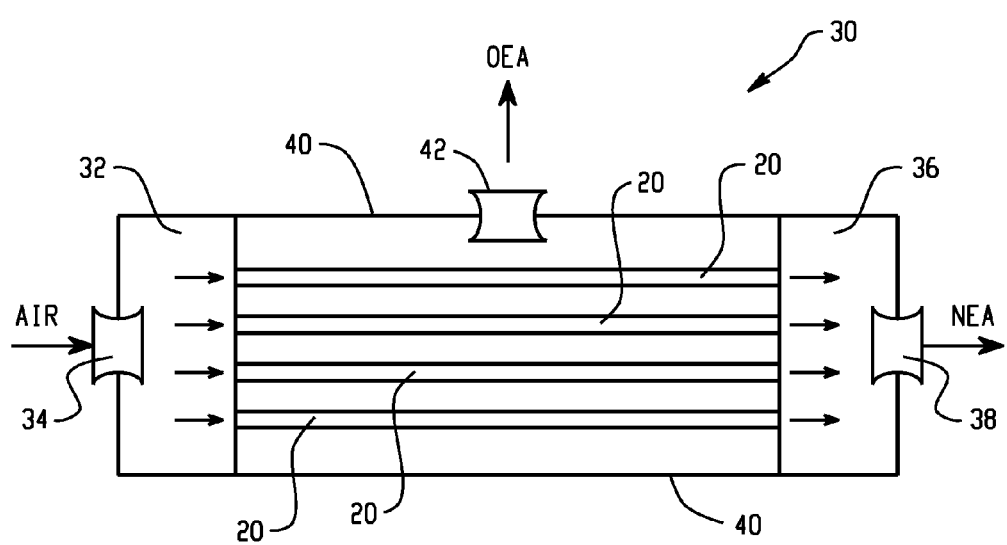
FIG. 3 is a schematic depiction of an exemplary device for separating oxygen and nitrogen.

Turning now to FIG. 3, a device 30 comprising multiple tubular membranes 20 for separating oxygen and nitrogen is schematically depicted. As shown in FIG. 3, a device 30 for separating oxygen and nitrogen has an intake plenum 32 with inlet 34 for receiving air from an air source (not shown) such as a compressor or vehicle air intake. Air in the intake plenum flows into the hollow cores 26 (FIG. 2) of tubular membranes 20 towards discharge plenum 36, where it is collected and discharged through NEA outlet 38. Oxygen flowing through the hollow cores 26 of the tubular membranes 20 preferentially (versus nitrogen) diffuses through the tubular membranes 20, so that the gas discharged into discharge plenum 36 is nitrogen enhanced. A housing 40 is disposed around the tubular membranes 20 and forms a sealed connection with the intake plenum 32 and the discharge plenum 36. The tubular membranes 20 also form sealed connections at each end with the intake plenum 32 and discharge plenum 36, respectively, so that housing 40 together with the inner surfaces of the plenums 32, 36 forms a chamber for collecting oxygen-enhanced air, which is discharged through OEA outlet 42. It will be appreciated that, based on the guidance provided herein, one skilled in the art would set component sizes (e.g., core and outside fiber diameters), number of fibers, etc., and also to set operating parameters such as control valve settings at the inlet and the outlets to provide pressure differentials and gas flow amounts to achieve a target gas diffusion profile through the membranes.

In some aspects of the invention, the methods and devices described herein produce a NEA stream of at least 90 vol. % nitrogen, more specifically at least 95% nitrogen, and even more specifically at least 98% nitrogen. In some aspects of the invention, the methods and devices described herein produce an OEA stream of at least 25 vol. % oxygen, more specifically at least 30% oxygen, and even more specifically at least 35% oxygen.

The polymer supports described herein can be formed from a number of different materials, including but not limited to polyethylene, polypropylene, polytetrafluoroethylene, polycarbonate, polyethersulfone, TPU (thermoplastic polyurethane), polyimide. Thickness of the polymer support can range from 50 nm to 1000 nm, more specifically from 100 nm to 750 nm, and even more specifically from 250 nm to 500 nm. The selectivity provided by the zeolite nanosheet layer can allow for a smaller thickness compared to conventional tortuous path polymer and polymer composite membranes resulting into more permeable polymer support. In the case of tubular membranes 20 as described in FIGS. 2 and 3, fiber diameters can range from 100 nm to 2000 nm, and fiber lengths can range from 0.2 m to 2 m.

Thickness of the zeolite nanosheet layer can range from 2 nm to 500 nm, more specifically from 2 nm to 100 nm, and even more specifically from 2 nm to 50 nm. The zeolite nanosheet particles themselves can have thicknesses ranging from 2 to 50 nm, more specifically 2 to 20 nm, and even more specifically from 2 nm to 10 nm. The mean diameter of the nanosheets can range from 50 nm to 5000 nm, more specifically from 100 nm to 2500 nm, and even more specifically from 100 nm to 1000 nm. Mean diameter of an irregularly-shaped tabular particle can be determined by calculating the diameter of a circular-shaped tabular particle having the same surface area in the x-y direction (i.e., along the tabular planar surface) as the irregularly-shaped particle. The zeolite nanosheets can be formed from any of various zeolite structures, including but not limited to framework type MFI, MWW, FER, LTA, FAU, and mixtures of the preceding with each other or with other zeolite structures. In a more specific group of exemplary embodiments, the zeolite nanosheets comprise zeolite structures selected from MFI, MWW, FER, LTA framework type. Zeolite nanosheets can be prepared using known techniques such as exfoliation of zeolite crystal structure precursors. For example, MFI and MWW zeolite nanosheets can be prepared by sonicating the layered precursors (multilamellar silicalite-1 and ITQ-1, respectively) in solvent. Prior to sonication, the zeolite layers can optionally be swollen, for example with a combination of base and surfactant, and/or melt-blending with polystyrene. The zeolite layered precursors are typically prepared using conventional techniques such as sol-gel method.

The zeolite nanosheet layer can be formed by coating a dispersion of the nanosheets in solvent onto the polymer support using known techniques, such as spray coating, dip coating, solution casting, etc. The dispersion can contain various additives known for nanodispersions, such as dispersing aids, rheology modifiers, etc. Polymeric additives can be used; however, a polymer binder is not needed, although a polymer binder can be included and in some embodiments is included. However, a polymer binder present in an amount sufficient to form a contiguous polymer phase having the zeolite nanosheets dispersed therein can provide passageways in the membrane for nitrogen to bypass the zeolite nanosheets. Accordingly, in some embodiments a polymer binder is excluded. In other embodiments, a polymer binder is present in an amount below that needed to form a contiguous polymer phase.

In some exemplary embodiments, the layer is applied with a vacuum enhanced dip coating process where a surface of the support is disposed in a nanosheet dispersion while a vacuum is applied from the opposite side of the support. This draws solvent from the dispersion through the polymer support, resulting in deposition of the nanosheets onto the support. In the case of hollow fiber membranes as shown in FIG. 2, this vacuum filtration technique is particularly effective, as the hollow core 26 provides an enclosed space from which to draw a vacuum without the necessity of a vacuum frame or similar structure that would be needed for a flat or planar membrane configuration.

After coating the layer of zeolite nanosheets onto the polymer support, the layer can be dried to remove residual solvent and optionally heated to fuse the nanosheets together into a contiguous layer. Such heat should be applied under conditions to limit any heat damage to the polymer support. This can be accomplished by limiting the duration of any heating to that sufficient to heat the very thin nanosheet layer without overheating the thicker underlying polymer support. Exemplary heating conditions can involve temperatures of 20° C. to 100° C., more specifically from 20° C. to 75° C., and even more specifically from 20° C. to 50° C.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of separating oxygen from nitrogen, comprising:
    coupling a source of air to a first side of a membrane comprising a polymer support and a layer comprising a plurality of zeolite nanosheet particles with thickness of 2 nm to 10 nm and mean diameter of 50 nm to 5000 nm;
    delivering the air such that a pressure differential between opposite sides of the membrane exists to cause oxygen in the hollow core to diffuse through the polymer support and the layer comprising zeolite nanosheet particles to the second side of the membrane, thereby producing nitrogen-enriched air on the first side of the membrane and oxygen-enriched air on the second side of the membrane.

2. The method of claim 1, wherein the zeolite nanosheet particles comprise zeolite structures selected from framework type MFI, MWW, FER, FAU, LTA and mixtures of the preceding with each other or with other zeolite structures.

3. The method of claim 1, wherein the zeolite nanosheet particles comprise zeolite structures are selected from MFI, MWW, LTA, and FER framework.

4. The method of claim 1, wherein the layer has a thickness of from 2 nm to 500 nm.

5. The method of claim 1, wherein the layer has a thickness of from 2 nm to 50 nm.

6. The method of claim 1, wherein the plurality of nanosheets are fused together.

7. The method of claim 1, wherein the nanosheet particles have the thickness from 2 nm to 5 nm.

8. The method of claim 1, wherein the nanosheet particles have the mean diameter from 50 nm to 1000 nm.

9. The method of claim 1, wherein the polymer support has a thickness of from 50 nm to 1000 nm.

10. The method of claim 1, further comprising delivering nitrogen-enriched air from the first side of the membrane to an aircraft fuel tank ullage space.

11. A device for separating nitrogen and oxygen, comprising a membrane comprising a polymer support and a layer comprising a plurality of zeolite nanosheet particles with thickness of 2 nm to 10 nm and mean diameter of 50 nm to 5000 nm.

12. The device of claim 11, membrane comprises a hollow polymer fiber wherein the polymer substrate is configured as a polymer shell surrounding a hollow core, the hollow core extending from one end of the fiber to the other end of the fiber and open at one end of the fiber to receive a flow of air and open at the opposite end of the fiber to discharge a flow of nitrogen-enriched air, and the layer comprising zeolite nanosheet particles is deposited on the hollow polymer fiber's exterior surface.

13. The device of claim 12, comprising a plurality of said hollow polymer fibers arranged in parallel between first and second plenums such that the hollow core of each fiber is in fluid communication with one of the plenums at each end of the fiber, wherein the first plenum is configured to deliver a flow of pressurized air into the hollow core of each of the plurality of fibers, and the second plenum is configured to receive a flow of nitrogen-enriched air from each of the plurality of fibers.

14. The device of claim 13, further comprising a housing disposed around the plurality of fibers the housing forming a sealed connection with each of the first and second manifolds to form a chamber for collecting oxygen-enriched air discharged through side-walls of the hollow polymer fibers.

15. A method of making the device of claim 12, comprising
    disposing a hollow polymer fiber comprising a polymer shell surrounding a hollow core that extends from one end of the fiber to the other end of the fiber in a coating composition comprising zeolite nanosheet particles with thickness of 2 nm to 10 nm and mean diameter of 50 nm to 5000 nm, such that the hollow core is isolated from the coating composition at each fiber end is connected to a source of vacuum on at least one end of the fiber;
    drawing a vacuum on the hollow core of the fiber, thereby causing a pressure differential between the exterior and the hollow core of the hollow polymer fiber, and deposition of a layer comprising zeolite nanosheet particles onto the hollow polymer fiber exterior; and
    heating the layer to fuse the zeolite nanosheet particles.

* * * * *